(12) United States Patent
Yang (10) Patent No.: US 7,733,970 B2
(45) Date of Patent: Jun. 8, 2010

(54) METHOD AND APPARATUS FOR DYNAMIC SWITCHING OF SPACE-TIME CODING/DECODING METHOD

(75) Inventor: Hongwei Yang, Shanghai (CN)

(73) Assignee: Alcatel Lucent, Paris (FR)

( * ) Notice: Subject to any disclaimer, the term of this patent is extended or adjusted under 35 U.S.C. 154(b) by 698 days.

(21) Appl. No.: 11/564,123

(22) Filed: Nov. 28, 2006

(65) Prior Publication Data

US 2007/0153925 A1    Jul. 5, 2007

(30) Foreign Application Priority Data

Nov. 30, 2005    (CN) .................... 2005 1 0110986

(51) Int. Cl.
*H04K 1/10* (2006.01)
(52) U.S. Cl. .................. 375/260; 370/468; 375/267; 455/224; 704/219
(58) Field of Classification Search .................. 375/260
See application file for complete search history.

(56) References Cited

U.S. PATENT DOCUMENTS

2005/0068909 A1    3/2005    Chae et al.

FOREIGN PATENT DOCUMENTS

| WO | 0145300 A1 | 6/2001 |
|---|---|---|
| WO | 2005055507 A1 | 6/2005 |

OTHER PUBLICATIONS

M. Morelli, et al.; "Further Results in Carrier Frequency Estimation for Transmissions Over Flat Fading Channels;" IEEE Communications Letters Dec. 1998' pp. 327-330; vol. 2; No. 12.
Vahid Tarokh, et al.; "Space-Time Block Codes from Orthogonal Designs;" IEEE Transactions on Information Theory Jul. 1999; pp. 1456-1467; vol. 45; No. 5.
Helmut Bolcskei, et al.; "Space-Frequency Coded broadband OFDM Systems;" copyright 2000 IEEE; pp. 1-6.
Andreas F. Molisch, et al.; "Space-Time-Frequency (STF) Coding for MIMO-OFDM Systems;" IEEE Communications Letters Sep. 2002; pp. 370-372; vol. 6; No. 9.
C.R.N. Athaudage, et al.; "Delay-spread estimation using cyclic-prefix in wireless OFDM systems;" IEE Proceedings Dec. 2004; pp. 559-566; vol. 151; No. 6.
Ganyoul et al, "Adaptive switching scheme for space-time coded OFDM systems", Vehicular Technology Conference, 2005. VTC-2005-Fall. 2005 IEEE 62nd Dallas, Texas, USA Sep. 25-28, 2005, Piscataway, NJ, USA, IEEE, vol. 3, Sep. 25, 2008, pp. 1455-1459, XP010878686.

*Primary Examiner*—David C Payne
*Assistant Examiner*—Adolf Dsouza
(74) *Attorney, Agent, or Firm*—Fay Sharpe LLP (57) ABSTRACT

Systems and methods are described for dynamic switching techniques for space-time coding/decoding based on channel status information for a MIMO-OFDM system. The system and method for dynamic switching of space-time coding mode include a determining step for determining a space-time coding mode based on feedback information by a transmitter; a mapping step for mapping the determined coding mode to a corresponding coder so that a number of sets symbol streams corresponding to respective transmit antennas are generated after coding a modulated symbol sequence for desired coding; and a feedback step for periodically feeding used coding mode information back to a receiver via a forward control channel.

19 Claims, 10 Drawing Sheets

METHOD AND APPARATUS FOR DYNAMIC SWITCHING OF SPACE-TIME CODING/DECODING METHOD

CROSS-REFERENCE TO RELATED APPLICATION(S)

This application is based on the Chinese Patent Application No. 200510110986.9 filed on Nov. 30, 2005, the disclosure of which is hereby incorporated by reference.

TECHNICAL FIELD

The present invention relates to the $4^{th}$ generation mobile communication technique, particularly to method and apparatus for dynamic switching of space-time coding/decoding mode based on channel status information for a MIMO-OFDM system.

BACKGROUND ART

A Multiple-Input Multiple-Output (MIMO) system is capable of obtaining frequency efficiency proportional to the number of transmit antennas in an environment of rich scattering and of obtaining very high wireless transmission rate in a condition of not sacrificing frequency resource and transmit power, and thereby it is widely concerned.

An Orthogonal Frequency Division Multiplexing (OFDM) system modulates transmit symbols onto orthogonal narrow-band sub-carriers so that the symbols transmitted on each sub-carrier is only subject to flat fading and thus design for receivers is largely simplified, which is an efficient solution to high rate wireless data transmission under multipath fading channels.

It is assumed that the channel is flat in an existing MIMO structure, but the actual wireless communication channel is frequency-selective. Therefore, combination of MIMO and OFDM will meet requirement of MIMO on channel selection and is one of advanced wireless communication solutions in future.

MIMO has two basic space-time structures. One is space-time coding and the main object thereof is to obtain coding gain. The other is space multiplexing and the main object thereof is to obtain data rate gain. There are three basic structures in space-time coding schemes: it is referred to as space-time block coding if space diversity is obtained by jointly coding the transmitted information symbol stream in space and time domains; it is referred to as space-frequency block coding if space diversity is obtained by jointly coding the transmitted information symbol stream in space and frequency domains; it is referred to as space-time-frequency block coding if space diversity is obtained by jointly coding the transmitted information symbol stream in space, time and frequency domains. Although diversity in space, time and frequency domains can be obtained by space-time-frequency coding, the space-time block coding and the space-frequency block coding (it is recorded as space-time/space-frequency block coding) is more efficient in an actual application since the space-time-frequency coding relatively has high complexity and low flexibility.

The existing technical solution is described as follows taking example for a two-transmit-two-receive MIMO-OFDM system.

Figure 1:
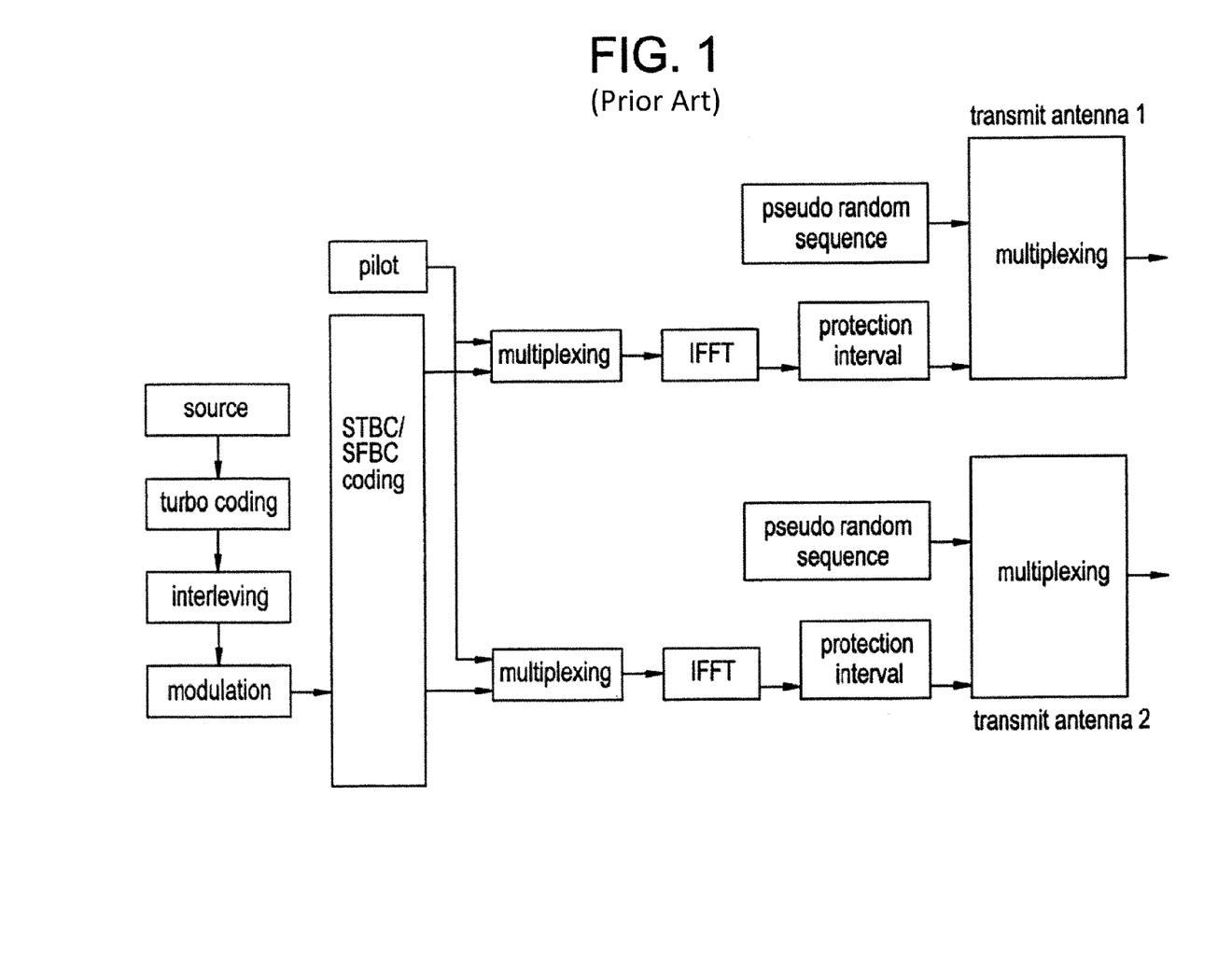
FIG. 1 is a schematic diagram showing structure of a STBC/SFBC transmitter of an existing MIMO-OFDM system.
Figure 2:
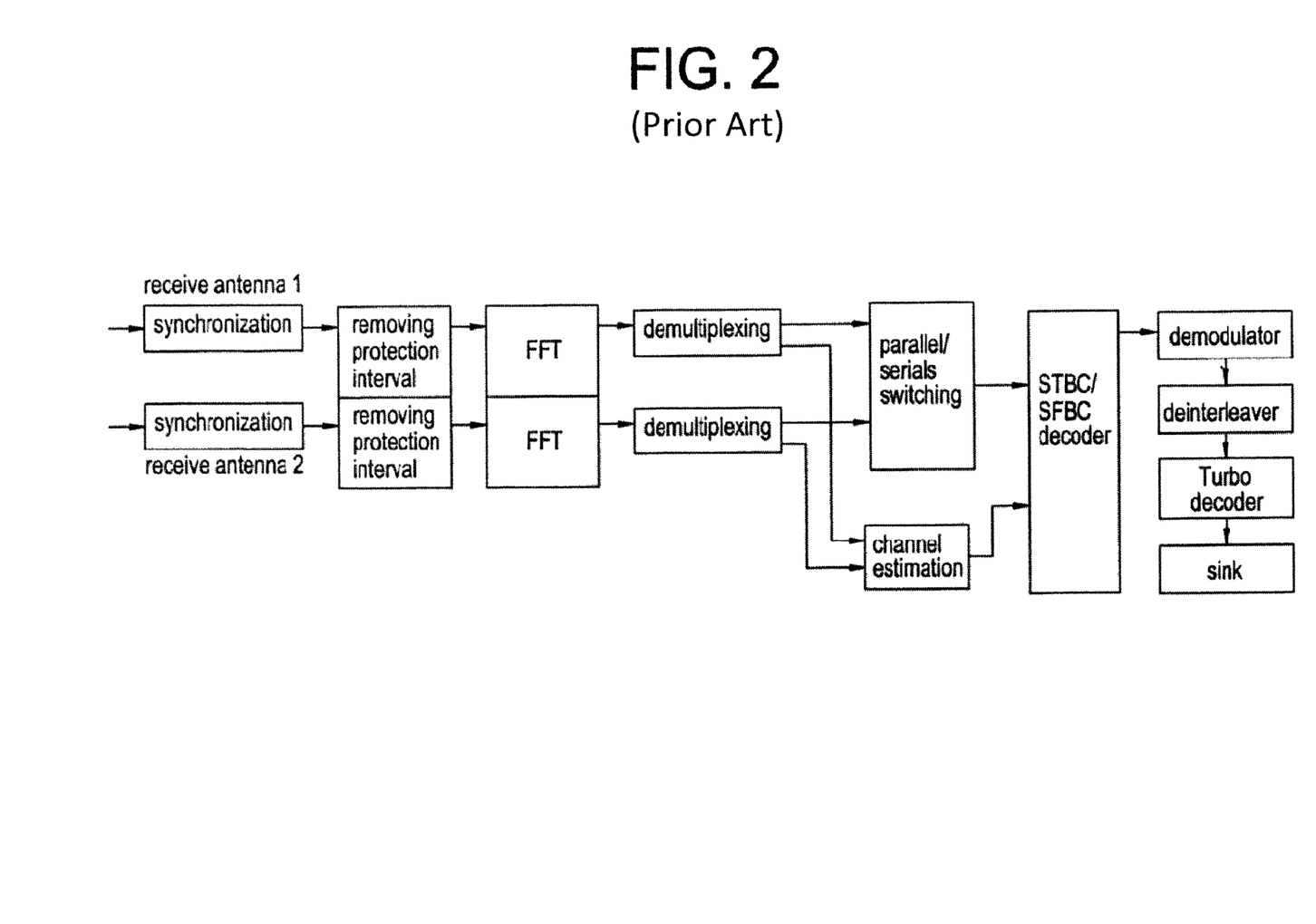
FIG. 2 is a schematic diagram showing structure of a STBC/SFBC receiver of an existing MIMO-OFDM system.

FIG. 1 and FIG. 2 respectively illustrated structures of transmitter and receiver for space-time block coding or space-frequency block coding in an existing MIMO-OFDM system. In the transmitter, the transmitted source bit sequence is mapped to a modulated constellation to generate a modulated symbol sequence after channel coding and interleaving. The modulated symbol sequence is space-time block coded (space-frequency block coded) to generate two sets of symbol streams respectively corresponding to transmit antenna 1 and transmit antenna 2. After pilot symbols are inserted according to pilot pattern, the respective symbol streams of the transmit antennas are inverse fast fourier transformed (IFFT) to generate OFDM symbols, each of which has circle prefix inserted at the head to generate a spread OFDM symbol. A number of spread OFDM symbols form a time slot, and a pseudo random synchronization sequence is inserted prior to each time slot for timing synchronization. A number of time slots form a transmission frame of minimum transmission unit.

In the receiver, the received symbols streams are first frame synchronized, time slot synchronized and symbol synchronized based on synchronization sequences. The synchronized spread OFDM symbols are fast fourier transformed (FFT) after the circle prefix is removed. A frequency domain pilot is extracted from the OFDM sub-carrier for channel estimation. The estimated channel frequency response is assistant for decoding of remain data symbols by a space-time block coding decoder/a space-frequency block coding decoder. The generated symbol streams are demodulated, deinterleaved and channel decoded to generate an estimated source bit sequence.

The main differences between the space-time block coding and the space-frequency block coding are described as follows in FIG. 3 and FIG. 4.

Figure 3:
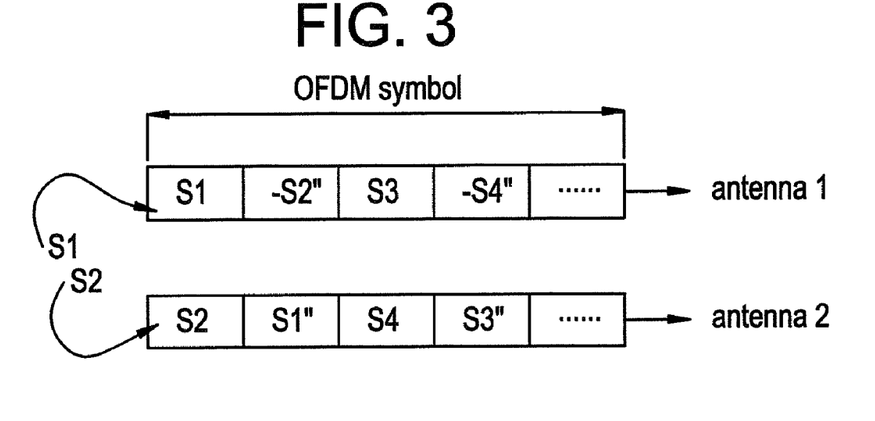
FIG. 3 is a schematic diagram of space-frequency coding.

As shown in FIG. 3, the pre-transmitted modulated symbols S1 and S2 are coded by a space-frequency block coder to generate a symbol stream S1, S1*, S2 and −S2*. Then, S1 and S1* are mapped to adjacent sub-carriers of the same OFDM symbol and transmitted by antenna 1; S2 and −S2* are mapped to adjacent sub-carriers of the same OFDM symbol and transmitted by antenna 2. As such, the next set of pre-transmitted modulated symbols S3 and S4 are coded by the space-frequency block coder to generate a symbol stream S3, S3*, S4 and −S4*. Then, S3 and −S4* are mapped to adjacent sub-carriers of the same OFDM symbol and transmitted by antenna 1; S4 and S3* are mapped to adjacent sub-carriers of the same OFDM symbol and transmitted by antenna 2.

Figure 4:
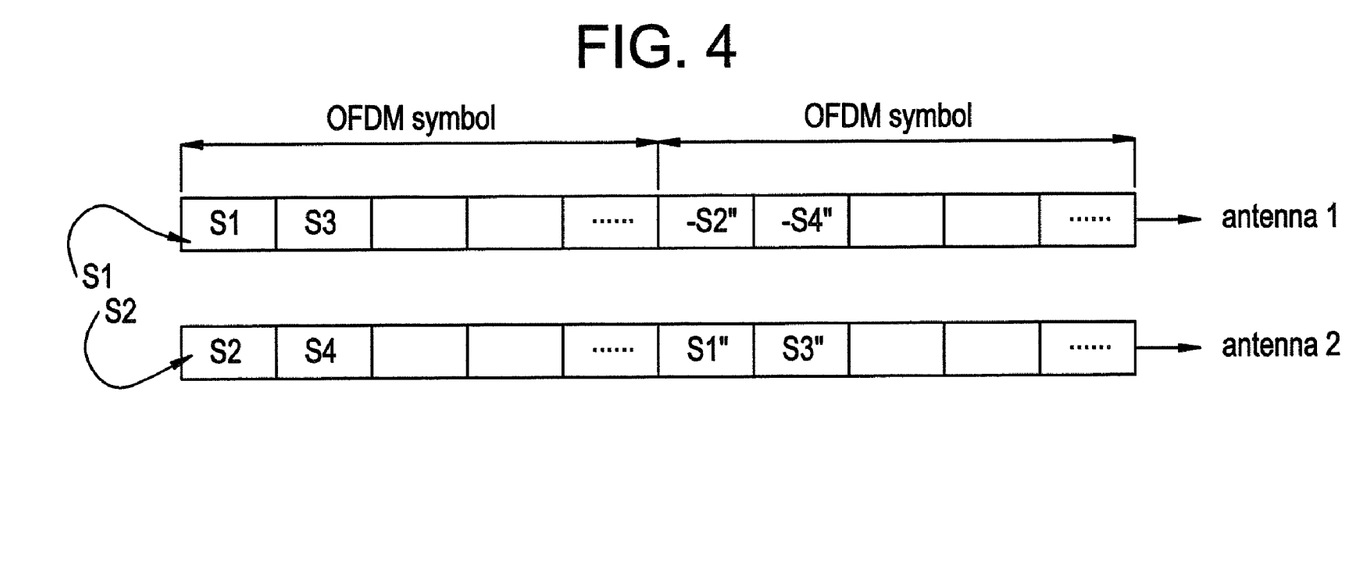
FIG. 4 is a schematic diagram of space-time coding.

As shown in FIG. 4, the pre-transmitted modulated symbols S1 and S2 are coded by a space-time block coder to generate a symbol stream S1, S1*, S2 and −S2*. Then, S1 and −S2* are mapped to adjacent sub-carriers of the same OFDM symbol and transmitted by antenna 1; S2 and S1* are mapped to adjacent sub-carriers of the same OFDM symbol and transmitted by antenna 2. The pre-transmitted modulated symbols S3 and S4 are coded by the space-time block coder to generate a symbol stream S3, S3*, S4 and −S4*. Then, S3 and −S4* are mapped to adjacent sub-carriers of the same OFDM symbol and transmitted by antenna 1; S4 and S3* are mapped to adjacent sub-carriers of the same OFDM symbol and transmitted by antenna 2.

It is assumed that the channel matrix is constant between adjacent coded OFDM symbols in the space-time block coding designed based on orthogonal signals. However, the symbol interval of the OFDM system largely increases compared with a single carrier system with the same bandwidth so that the condition that the channel matrix is constant between adjacent coded OFDM symbols is difficult to be achieved, and thus the performance of space-time block coding is degraded. Particularly, since the future mobile communication system supports users with higher frequency band and higher moving speed, signals subject to fast fading will badly degrade performance of the space-time block coding. Similarly, the channel matrix is constant between adjacent coded OFDM symbols in the space-frequency block coding designed based on orthogonal signals. However, the actual channel is usually frequency-selective, so that the condition that the channel matrix is constant between adjacent coded OFDM symbols is difficult to be achieved, and thus the performance of space-frequency block coding is degraded.

Figure 5:
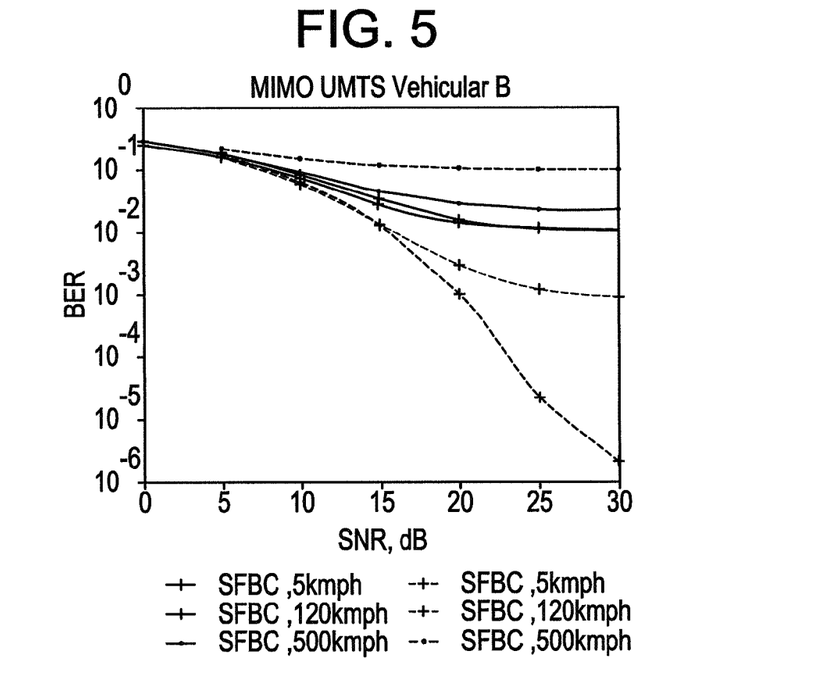
FIG. 5 is a schematic diagram of comparison of performance of space-frequency block coding and space-time block coding at different moving speed on a channel with low delay spreading.
Figure 6:
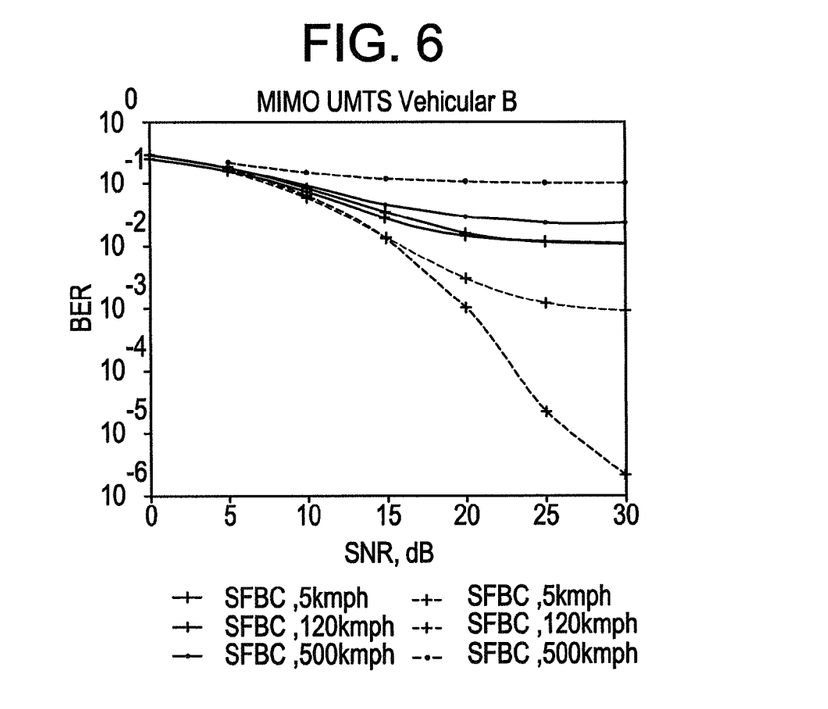
FIG. 6 is a schematic diagram of comparison of performance of space-frequency block coding and space-time block coding at different moving speed on a channel with high delay spreading.

FIG. 5 and FIG. 6 respectively illustrate comparison of performances of the space-time block coding and the space-frequency block coding at different delay spreading and different moving speed. When delay spreading of channel is less, the same bit error rate (BER) performance is obtained in a range of moving speed of 5-120 kmph for the space-frequency block coding (SFBC). Even when the moving speed is up to 500 kmph, performance as good as at a low speed can be obtained for the space-frequency block coding if an ideal technique for removing interference between carriers is used. When delay spreading of channel is greater, performance will be badly degraded in a variety of ranges of moving speed for the space-frequency block coding, which attributes to channel frequency-selection caused by greater delay spreading resulting in non-constant between adjacent carriers of the space-time block coding. Similarly, good BER performance can be obtained for the space-time block coding at a low moving speed of 5 kmph no matter how much the channel delay spreading is. However, in a range of moving speed of 120-150 kmph, the performance of the space-time block coding is badly degraded, which attributes to fast channel fading caused by greater Doppler shift resulting in non-constant channel between coded symbols in the time domain.

In one word, the space-time coding can operate at frequency-selective channels, but it is subject to effect on orthogonality by Doppler shift, which badly degrades performance; the space-frequency coding can operate at Doppler shift channels, but it is subject to effect on orthogonality by frequency-selection, which badly degrades performance.

Therefore, there is a certain limit in the environment of any existing space-time coding scheme.

CONTENT OF THE INVENTION

The present invention is directed to provide dynamic switching technique for space-time coding/decoding mode based on channel status information, by which advantages such as low complexity of space-time coding, stable performance under space associated channels, complete space diversity and etc. can remain while the application environment of space-time or space-frequency block coding in a OFDM system can be extended and thus a MIMO OFDM system can be applied in a number of complex propagation environments.

The first of the present invention: a method for dynamic switching of space-time coding mode.

The method comprises: determining step for determining a space-time coding mode based on feedback information by a transmitter; mapping step for mapping the determined coding mode to a corresponding coder so that a number of sets symbol streams corresponding to respective transmit antennas are generated after coding a modulated symbol sequence for desired coding; and feedback step for periodically feeding used coding mode information back to a receiver via a forward control channel.

In the above method for dynamic switching of space-time coding mode, the space-time coding mode comprises a space-time block coding mode and a space-frequency block coding mode.

In the above method for dynamic switching of space-time coding mode, the feedback information of a reverse channel comprises coherent bandwidth and coherent time of the channel.

In the above method for dynamic switching of space-time coding mode, the coherent bandwidth of the channel is set as bandwidth with a channel frequency response having a correlation coefficient greater than 0.5; said coherent time of the channel is set as a time interval with a channel impulse response having a correlation coefficient greater than 0.5.

In the above method for dynamic switching of space-time coding mode, the rule for the determining space-time coding mode is that the space-frequency block coding is determined if the coherent bandwidth is greater than a given multiple of interval width between two sub-carriers.

In the above method for dynamic switching of space-time coding mode, the rule for the determining space-time coding mode is that the space-time block coding is determined if the coherent time is greater than a given multiple of time interval between two spread OFDM symbols.

In the above method for dynamic switching of space-time coding mode, the rule for the determining space-time coding mode is that the space-frequency block coding is determined if $$\alpha \cdot \frac{\text{width between two sub-carriers}}{\text{correlation bandwidth}}$$

is less than $$\frac{\text{time interval between two OFDM symbols}}{\text{correlation time}},$$

wherein α is a experience coefficient associated with channel characteristics.

The second of the present invention: an apparatus for dynamic switching of space-time coding mode.

The apparatus is arranged in a transmitter and comprises a determining unit, a first mapping unit and a first feedback unit connected in turn, wherein the determining unit is used for determining a space-time coding mode based on received feedback information of a reverse channel; the first mapping unit is used for mapping the determined coding mode to a corresponding coder so that a number of sets symbol streams corresponding to respective transmit antennas are generated after coding a modulated symbol sequence for desired coding; the first feedback unit is used for periodically feeding used coding mode information back to a receiver via a forward control channel.

In the above apparatus for dynamic switching of space-time coding mode, the space-time coding mode determined by the determining unit comprises a space-time block coding mode and a space-frequency block coding mode.

In the above apparatus for dynamic switching of space-time coding mode, the feedback information received by the determining unit comprises coherent bandwidth and coherent time of the channel.

In the above apparatus for dynamic switching of space-time coding mode, the coherent bandwidth of the channel is set as bandwidth with a channel frequency response having a correlation coefficient greater than 0.5; said coherent time of the channel is set as a time interval with a channel impulse response having a correlation coefficient greater than 0.5.

In the above apparatus for dynamic switching of space-time coding mode, the rule for the determining space-time coding mode by the determining unit is that the space-frequency block coding is determined if the coherent bandwidth is greater than a given multiple of interval width between two sub-carriers.

In the above apparatus for dynamic switching of space-time coding mode, the rule for the determining space-time coding mode by the determining unit is that the space-time block coding is determined if the coherent time is greater than a given multiple of time interval between two spread OFDM symbols.

In the above apparatus for dynamic switching of space-time coding mode, the rule for the determining space-time coding mode by the determining unit is that the space-frequency block coding is determined if α·width between two sub-carriers/correlation bandwidth is less than time interval between two OFDM symbols/correlation time, wherein α is a experience coefficient associated with channel characteristics.

The third of the present invention: a method for dynamic switching for space-time decoding mode.

The method comprises: receiving step for receiving space-time coding mode information used at a transmitter and transmitted by a forward control channel; mapping step for mapping the received coding mode information to a decoder of a corresponding space-time decoding mode for decoding in a corresponding mode; and feedback step for feeding coherent bandwidth and coherent time of channel status information back to the transmitter via a reverse control channel.

In the above method for dynamic switching of space-time decoding mode, the space-time coding mode comprises a space-time block coding mode and a space-frequency block coding mode.

The fourth of the present invention: an apparatus for dynamic switching for space-time decoding mode.

The apparatus is arranged in a receiver and comprises a receiving unit, a second mapping unit and a second feedback unit connected in turn, wherein the receiving unit is used for receiving space-time coding mode information used at a transmitter and transmitted by a forward control channel; the second mapping unit is used for mapping the received coding mode information to a decoder of a corresponding space-time decoding mode for decoding in a corresponding mode; and the second feedback unit is used for feeding coherent bandwidth and coherent time of channel status information back to the transmitter via a reverse control channel.

In the above apparatus for dynamic switching of space-time decoding mode, the space-time coding mode comprises a space-time block coding mode and a space-frequency block coding mode.

The fifth of the present invention: a transmitter

The features of the transmitter are that it comprises a coder with two modes of space-time block coding and space-frequency block coding and a switching means for space-time/space-frequency block coding mode, wherein the switching means for space-time/space-frequency block coding mode is used for determining coding mode based on information on coherent bandwidth and coherent time of a received reverse channel feedback and space-time block coding or space-frequency block coding a modulated symbol sequence for desired coding in a corresponding mode to generate a number of sets symbol streams corresponding to respective transmit antennas and further periodically feeding the used coding mode back to a receiver via a forward control channel.

The sixth of the present invention: a receiver

The features of the receiver are that it comprises a decoder with two modes of space-time block coding and space-frequency block coding and a switching means for space-time/space-frequency block decoding mode, wherein the switching means for space-time/space-frequency block decoding mode is used for mapping the received space-time coding mode information to a decoder of a corresponding space-time decoding mode for decoding in a corresponding mode based on the space-time coding mode information used at a transmitter and transmitted by a forward control channel; and further feeding coherent bandwidth and coherent time of channel status information back to the transmitter via a reverse control channel.

Using the above technical solution, i.e. the present invention provides dynamic switching technique for space-time coding/decoding mode based on channel status information, coherent bandwidth and coherent time are defined as measurement of switching threshold and the corresponding switching policy is proposed to retain advantages such as low complexity of space-time coding, stable performance under space associated channels, complete space diversity and etc. and extend the application environment of space-time or space-frequency block coding in a OFDM system so that a MIMO OFDM system can be applied in a number of complex propagation environments.

MODE OF CARRYING OUT THE INVENTION

I. Transmitter

Figure 7:
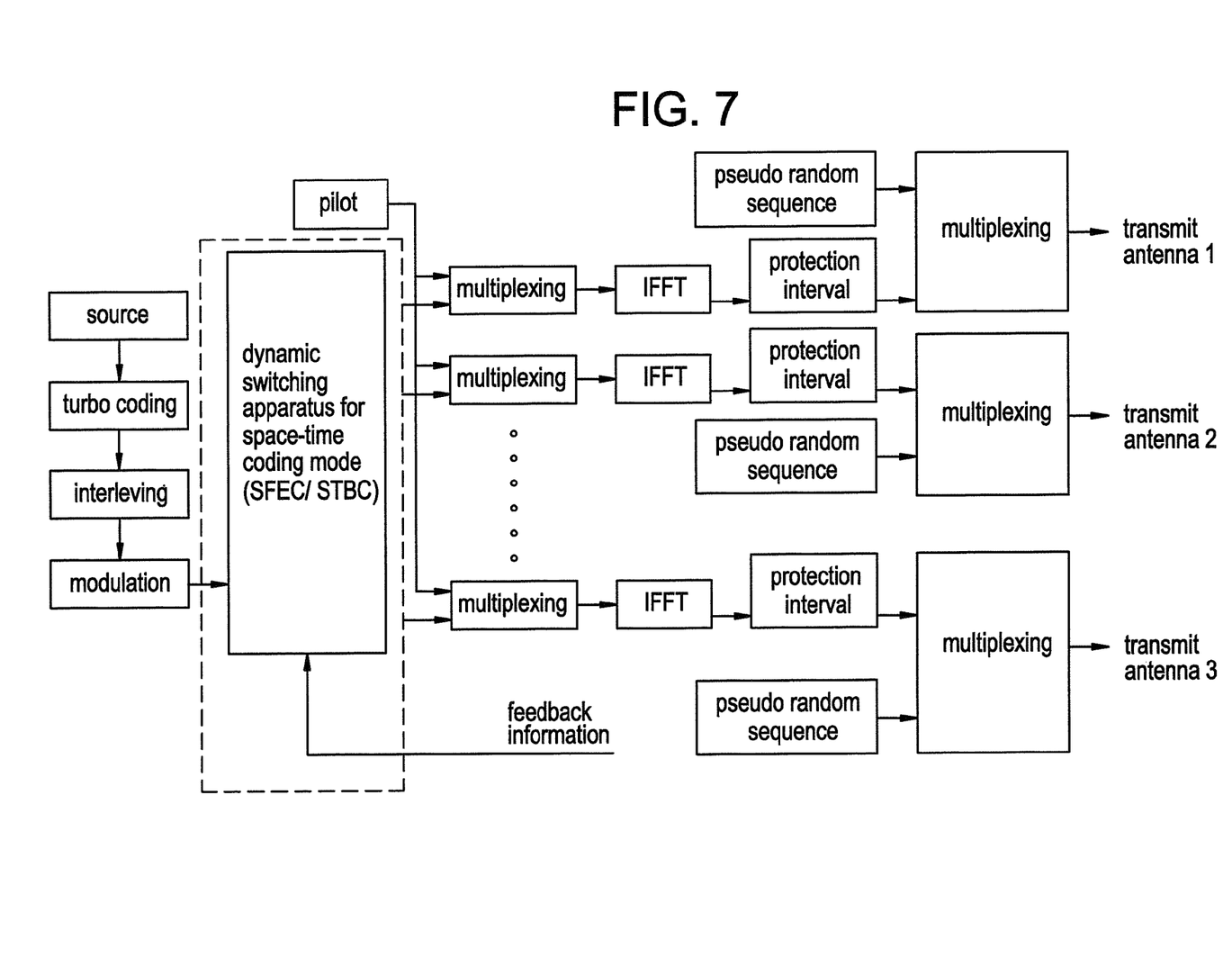
FIG. 7 shows a transmitter of the present invention, i.e. a schematic diagram showing structure of a transmitter having switching means for space-time/space-frequency block coding mode in a MIMO-OFDM system.

Referring to FIG. 7, after initialization, the transmitted source bit sequence is mapped to a modulated constellation to generate a modulated symbol sequence after channel coding and interleaving. The dynamic switching means for space-time coding mode is usually used as the dynamic switching means for space-time/space-frequency block coding mode, which determines space-time coding mode based on control information of the reverse channel feedback and space-time block codes or space-frequency block codes the modulated symbol sequence in a corresponding mode to generate three sets symbol streams respectively corresponding to transmit antenna 1, transmit antenna 2 and transmit antenna 3, while the used coding mode is periodically fed back to the receiver via a forward control channel. After pilot symbols are inserted according to pilot pattern, the respective symbol streams of the transmit antennas are inverse fast fourier transformed (IFFT) with length of N to generated OFDM symbols, each of which has circle prefix with length of CP samples inserted at the head to generated a spread OFDM symbol. A number of spread OFDM symbols form a time slot, and a pseudo random synchronization sequence is inserted prior to each time slot for timing synchronization. A number of time slots form a transmission frame as a minimum transmission unit for transmission of symbols. The sampling frequency is $f_s$ Hz.

II. Receiver

Figure 8:
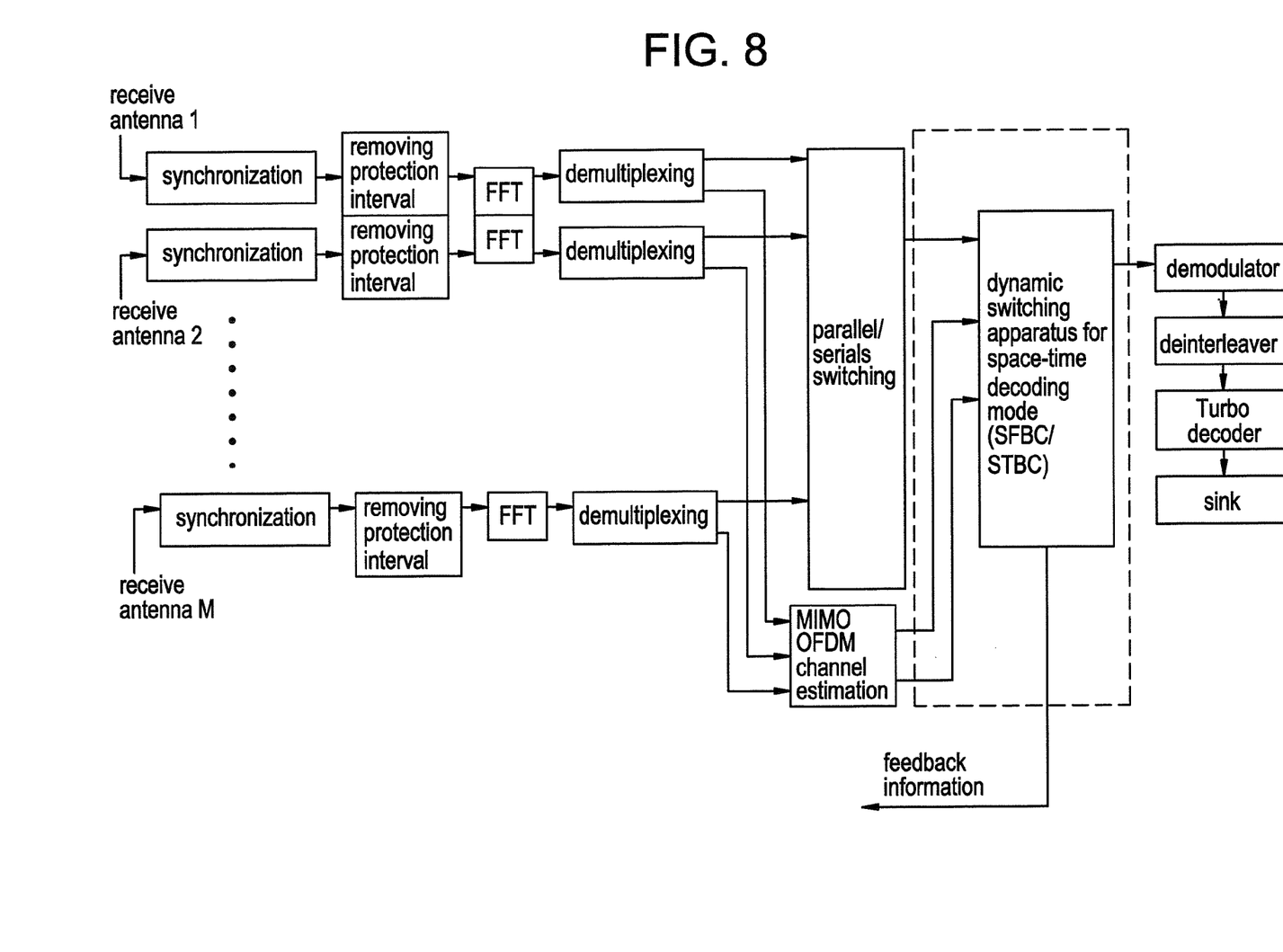
FIG. 8 shows a receiver of the present invention, i.e. a schematic diagram showing structure of a transmitter having switching means for space-time/space-frequency block decoding mode in a MIMO-OFDM system.

Referring to FIG. 8, after initialization, the received symbols streams are first frame synchronized, time slot synchronized and symbol synchronized based on synchronization sequences. The synchronized spread OFDM symbols are fast fourier transformed (FFT) after the circle prefix is removed. A MIMO-OFDM channel estimation unit performs channel estimation using a frequency domain pilot extracted from the OFDM symbols to generate a channel matrix and periodically estimates channel status information such as coherent bandwidth and coherent time. That is, a dynamic switching means for space-time/space-frequency block decoding mode decodes the extracted data symbols in a corresponding mode using the channel matrix based on space-time/space-frequency coding mode used at the transmitter and demodulated by a forward control channel, while the coding mode is determined based on the periodically received coherent bandwidth and coherent time for channel and periodically fed back to the transmitter via a reverse control channel. The generated symbol streams are demodulated, deinterleaved and channel decoded to generate a estimated source bit sequence.

III. Measurement and Policy of Dynamic Switching for Coding Mode

Bandwidth with a channel frequency response having a correlation coefficient greater than 0.5 is set as the coherent bandwidth of channel $B_c$, which depends on delay spreading of channel, which can be easily obtained from channel impulse response estimated by a channel estimator in the prior art or estimated by the circle prefix of the OFDM system and whose reciprocal can be approximated as the coherent bandwidth of channel. Similarly, a time interval with a channel impulse response having a correlation coefficient greater than 0.5 is set as the coherent time of channel $T_c$, which depends on Doppler shift of channel, which can be estimated by time domain correlation of channel impulse response estimated by the channel estimator in the prior art and whose reciprocal can be approximated as the coherent time of channel. Apparently, a channel estimation unit can estimate the coherent bandwidth of channel and the coherent time of channel based on the estimated channel response. The estimation of the coherent time and coherent bandwidth of channel does not belong to the range of the present invention, so we always assume that the coherent bandwidth and the coherent time of channel is ideally estimated and the above estimation thereof will not be further described herein.

Apparently, if the coherent bandwidth is largely greater than interval width between two sub-carriers, i.e. $B_c \gg f_s/N$, then it can be considered that the channel within two sub-carriers is flat, that is, the channel frequency response within two sub-carriers is constant. At this time, space-frequency coding is performed between a number of antennas and two sub-carriers, and thus dynamic changes of channel will not degrade performance of space-frequency coding.

As such, if the coherent time is largely greater than time interval between two spread OFDM symbols, i.e.

$$T_c \gg \left(1 + \frac{CP}{N}\right)/f_s,$$

then it can be considered that the channel within two OFDM symbols is slowly fading, that is, the channel impulse response within two OFDM symbols is constant. At this time, space-time coding is performed between a number of antennas and two OFDM symbols, and thus dynamic changes of channel will not degrade performance of space-time coding.

Therefore, we define the coherent bandwidth and the coherent time of channel as measurement of dynamic adjustment for coding mode and the coding mode is set according to the following policy, in which when the space-time block coding mode is 0, it corresponds to space-frequency block coding; when the space-time block coding mode is 1, it corresponds to space-time block coding.

Figure 9:
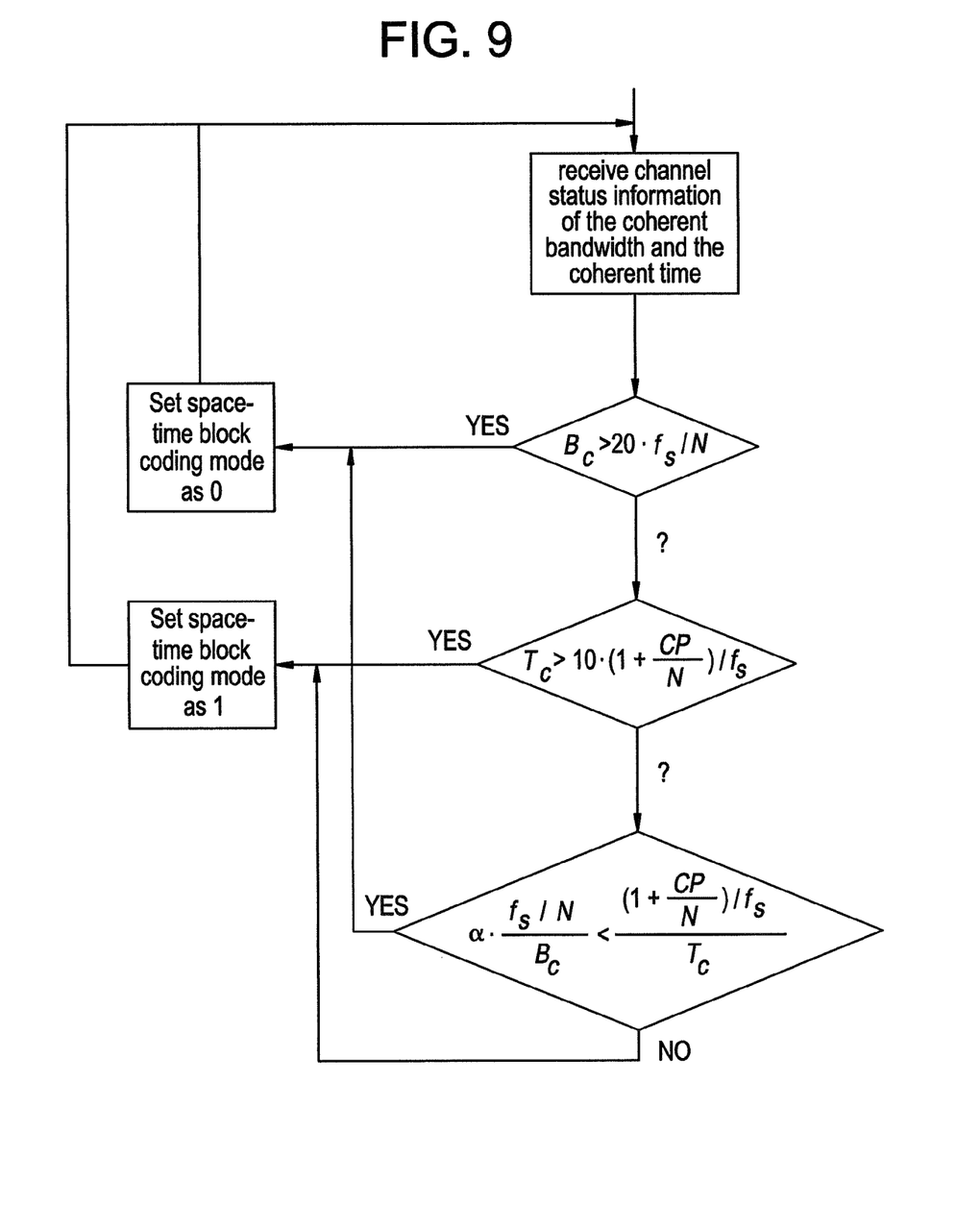
FIG. 9 is a schematic diagram of a flow for dynamic determination of space-time/space-frequency block coding mode.

As shown in FIG. 9, after channel status information of the coherent bandwidth and the coherent time is received, the following determination is made:

1) The space-time block coding mode is set as 0 if the coherent bandwidth is largely greater than interval width between two sub-carriers, i.e. $B_c > 20 \cdot f_s/N$.

2) Otherwise, the space-time block coding mode is set as 1 if the coherent time is largely greater than time interval between two spread OFDM symbols, $$T_c > 10 \cdot \left(1 + \frac{CP}{N}\right)/f_s.$$

3) Otherwise, the space-time block coding mode is set as 0 if $$\alpha \cdot \frac{\text{width between two sub-carriers}}{\text{correlation bandwidth}}$$

is less than $$\frac{\text{time interval between two OFDM symbols}}{\text{correlation time}},$$

wherein α is a experience coefficient associated with channel characteristics and the default thereof is 2.

4) Otherwise, the space-time block coding mode is set as 1.

IV. Operation Flow for Dynamic Switching of Space-Time Coding/Decoding Mode

Figure 10:
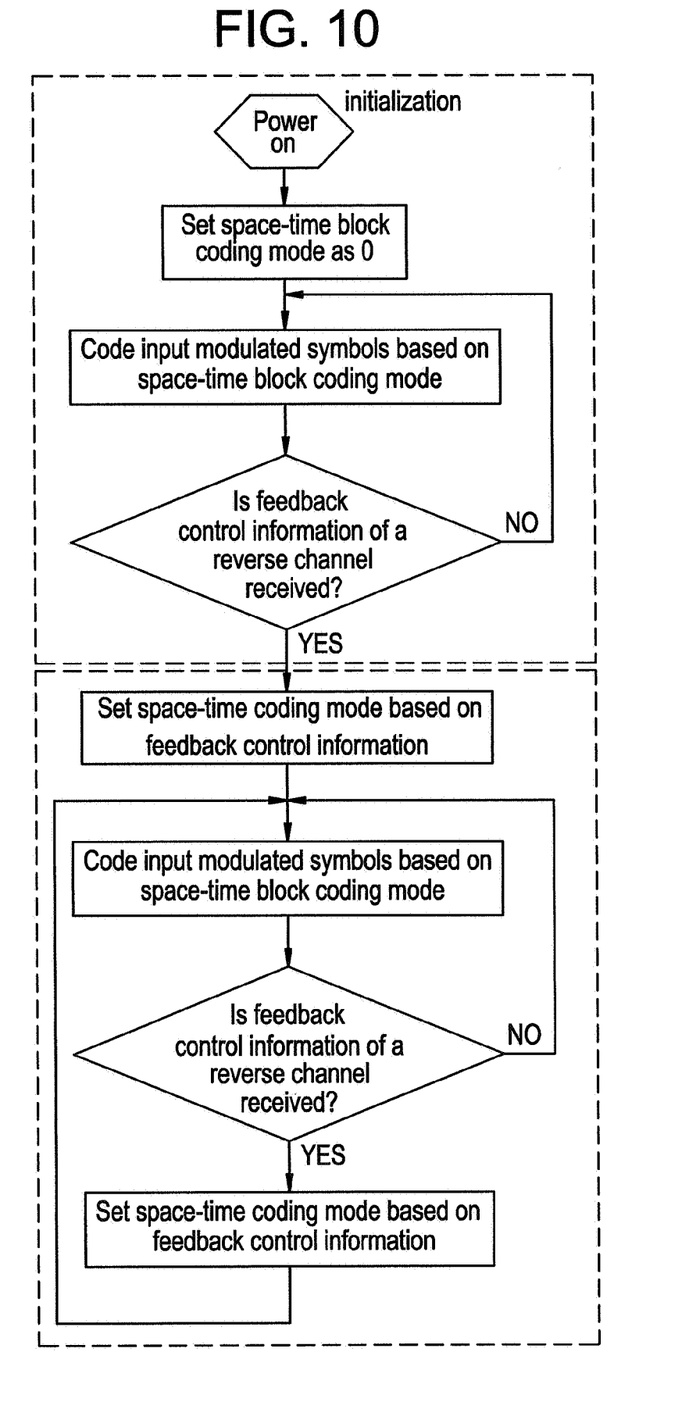
FIG. 10 is a schematic diagram of an operational flow for dynamic switching of space-time coding mode.

As shown in FIG. 10, a dynamic switching flow for space-time coding mode is illustrated.

Initializing step: setting the space-time block coding mode as 0, coding the input modulated symbols based on the space-time block coding mode and determining whether feedback control information of a reverse channel is received;

Space-time coding mode switching step: setting a corresponding space-time coding mode based on feedback control information if the feedback control information is received; coding the input modulated symbols based on the space-time block coding mode, determining whether feedback control information of a reverse channel is received or not, if yes, setting a corresponding space-time coding mode based on feedback control information. The flow circles as above.

Figure 11:
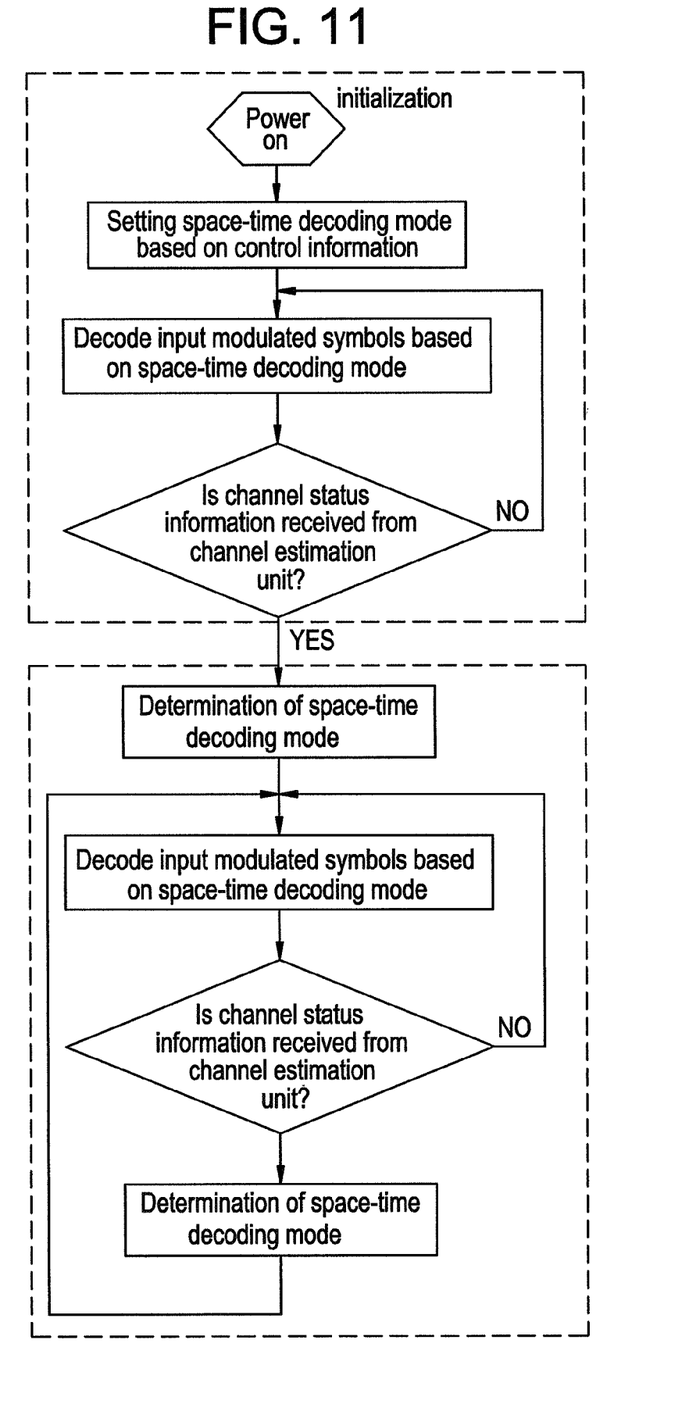
FIG. 11 is a schematic diagram of an operational flow for dynamic switching of space-time decoding mode.

As shown in FIG. 11, a dynamic switching flow for space-time decoding mode is illustrated.

Initializing step: setting the space-time decoding mode based on control information, decoding the input modulated symbols based on the space-time decoding mode and determining whether channel status information is received from a channel estimation unit;

Space-time decoding mode switching step: making determination of the space-time decoding mode if channel status information is received from a channel estimation unit; decoding the input modulated symbols based on the space-time decoding mode, determining whether channel status information is received from a channel estimation unit, and making determination of the space-time decoding mode again. The flow circles as above.

V. Dynamic Switching Apparatus for Space-Time Coding/Decoding Mode

Figure 12:
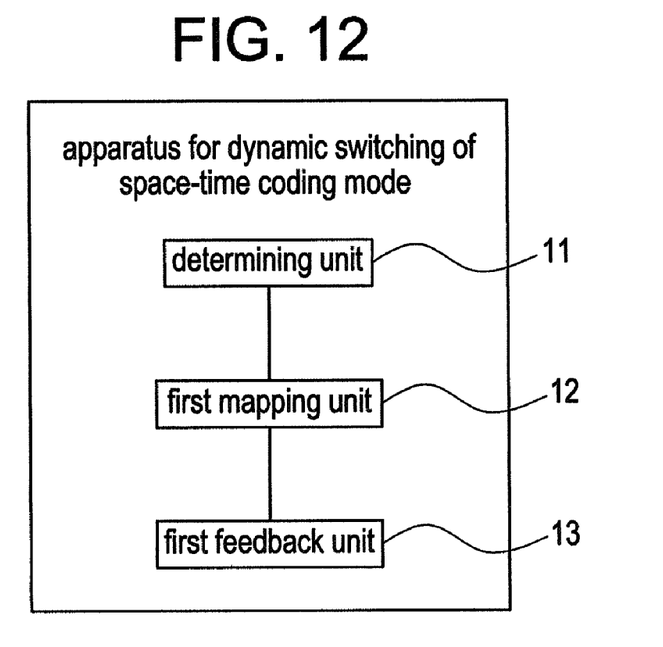
FIG. 12 is a schematic diagram shows structure of an apparatus for dynamic switching of space-time coding mode.

As shown in FIG. 12, an apparatus for dynamic switching of space-time coding mode is arranged in a transmitter and comprises a determining unit 11, a first mapping unit 12 and a first feedback unit 13 connected in turn, wherein:

the determining unit 10 is used for determining a space-time coding mode based on received feedback information of a reverse channel;

the first mapping unit 12 is used for mapping the determined coding mode to a corresponding coder so that a number of sets symbol streams corresponding to respective transmit antennas are generated after coding a modulated symbol sequence for desired coding;

the first feedback unit 13 is used for periodically feeding the used coding mode information back to a receiver via a forward control channel.

Figure 13:
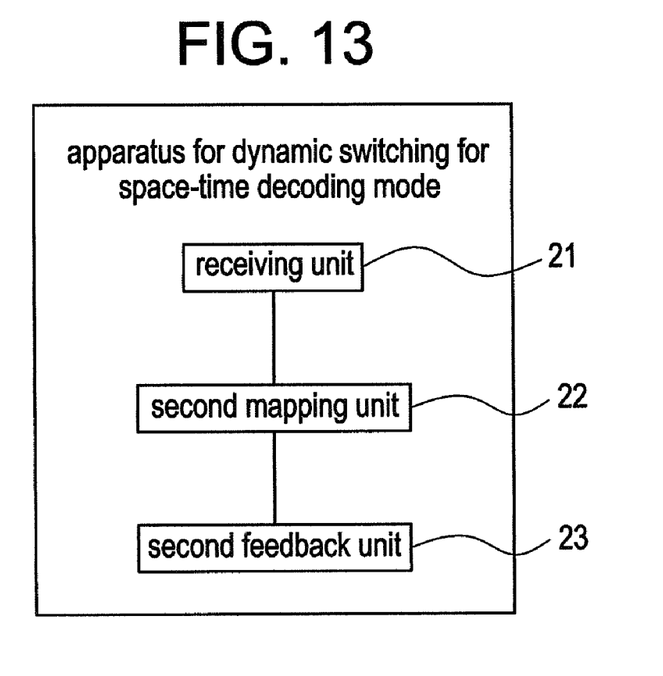
FIG. 13 is a schematic diagram shows structure of an apparatus for dynamic switching of space-time decoding mode.

As shown in FIG. 13, an apparatus for dynamic switching for space-time decoding mode is arranged in a receiver and comprises a receiving unit 21, a second mapping unit 22 and a second feedback unit 23, wherein:

the receiving unit 21 is used for receiving the space-time coding mode information used at a transmitter and transmitted by a forward control channel;

the second mapping unit 22 is used for mapping the received coding mode information to a decoder of a corresponding space-time decoding mode for decoding in a corresponding mode; and the second feedback unit 23 is used for feeding coherent bandwidth and coherent time of channel status information back to the transmitter via a reverse control channel.

Summing up the above, the present invention provides dynamic switching method and apparatus for space-time coding/decoding mode based on channel status information, coherent bandwidth and coherent time are defined as measurement of switching threshold and the corresponding switching policy is proposed to retain advantages such as low complexity of space-time coding, stable performance under space associated channels, complete space diversity and etc. and extend the application environment of space-time or space-frequency block coding in a OFDM system so that a MIMO OFDM system can be applied in a number of complex propagation environments.

It should be understood from the foregoing that, while particular embodiments of the invention have been illustrated and described, various alternatives and modifications can be made thereto without departing from the spirit and scope of the invention. Therefore, it is not intended that the invention be limited by the specification; instead, the scope of the present invention is intended to be limited only by the appended claims.

The invention claimed is:

1. A method for dynamic switching of space-time coding mode, comprising:
    determining a space-time coding mode based on feedback information by a transmitter;
    mapping the determined coding mode to a corresponding coder so that a number of sets symbol streams corresponding to respective transmit antennas are generated after coding a modulated symbol sequence for desired coding; and
    periodically feeding the used coding mode information back to a receiver via a forward control channel;
    wherein the feedback information is communicated from the receiver to the transmitter via a reverse channel, the feedback information comprising a coherent bandwidth of the forward control channel and a coherent time of the forward control channel; and
    wherein the coherent bandwidth is set as bandwidth with a channel frequency response having a correlation coefficient greater than 0.5, and the coherent time is set as a time interval with a channel impulse response having a correlation coefficient greater than 0.5.

2. The method for dynamic switching of space-time coding mode as claimed in claim 1, wherein the space-time coding mode comprises a space-time block coding mode and a space-frequency block coding mode.

3. The method for dynamic switching of space-time coding mode as claimed in claim 1, wherein a rule for the determining space-time coding mode is that space-frequency block coding is determined if the coherent bandwidth is greater than a given multiple of interval width between two sub-carriers.

4. The method for dynamic switching of space-time coding mode as claimed in claim 1, wherein a rule for the determining space-time coding mode is that space-time block coding is determined if the coherent time is greater than a given multiple of time interval between two spread OFDM symbols.

5. The method for dynamic switching of space-time coding mode as claimed in claim 1, wherein a rule for the determining space-time coding mode is that space-frequency block coding is determined if α·width between two sub-carriers/correlation bandwidth less than time interval between two OFDM symbols/correlation time, wherein α is a experience coefficient associated with channel characteristics.

6. An apparatus for dynamic switching of space-time coding mode, which is arranged in a transmitter and comprises:
   a determining unit,
   a first mapping unit, and
   a first feedback unit connected in turn,
   wherein:
      the determining unit is used for determining a space-time coding mode based on received feedback information communicated from a receiver to the transmitter via a reverse channel;
      the first mapping unit is used for mapping the determined coding mode to a corresponding coder so that a number of sets symbol streams corresponding to respective transmit antennas are generated after coding a modulated symbol sequence for desired coding;
      the first feedback unit is used for periodically feeding the used coding mode information back to the receiver via a forward control channel;
      wherein the feedback information received by the determining unit comprises a coherent bandwidth of the forward control channel and a coherent time of the forward control channel; and
      wherein the coherent bandwidth is set as bandwidth with a channel frequency response having a correlation coefficient greater than 0.5, and the coherent time is set as a time interval with a channel impulse response having a correlation coefficient greater than 0.5.

7. The apparatus for dynamic switching of space-time coding mode as claimed in claim 6, wherein the space-time coding mode determined by the determining unit comprises a space-time block coding mode and a space-frequency block coding mode.

8. The apparatus for dynamic switching of space-time coding mode as claimed in claim 6, wherein a rule for the determining space-time coding mode by the determining unit is that space-frequency block coding is determined if the coherent bandwidth is greater than a given multiple of interval width between two sub-carriers.

9. The apparatus for dynamic switching of space-time coding mode as claimed in claim 6, wherein a rule for the determining space-time coding mode by the determining unit is that space-time block coding is determined if the coherent time is greater than a given multiple of time interval between two spread OFDM symbols.

10. The apparatus for dynamic switching of space-time coding mode as claimed in claim 6, wherein a rule for the determining space-time coding mode by the determining unit is that space-frequency block coding is determined if α·width between two sub-carriers/correlation bandwidth is less than time interval between two OFDM symbols/correlation time, wherein α is a experience coefficient associated with channel characteristics.

11. A method for dynamic switching for space-time decoding mode, comprising:
   receiving space-time coding mode information used at a transmitter and transmitted by a forward control channel;
   mapping the received coding mode information to a decoder of a corresponding space-time decoding mode for decoding in a corresponding mode; and
   feeding a coherent bandwidth of the forward control channel and a coherent time of the forward control channel back to the transmitter via a reverse control channel;
   wherein the coherent bandwidth is set as bandwidth with a channel frequency response having a correlation coefficient greater than 0.5, and the coherent time is set as a time interval with a channel impulse response having a correlation coefficient greater than 0.5.

12. The method for dynamic switching of space-time decoding mode as claimed in claim 11, wherein the space-time coding mode comprises a space-time block coding mode and a space-frequency block coding mode.

13. An apparatus for dynamic switching for space-time decoding mode, which is arranged in a receiver and comprises
   a receiving unit,
   a mapping unit, and
   a feedback unit connected in turn,
   wherein:
      the receiving unit is used for receiving space-time coding mode information used at a transmitter and transmitted by a forward control channel;
      the mapping unit is used for mapping the received coding mode information to a decoder of a corresponding space-time decoding mode for decoding in a corresponding mode; and
      the feedback unit is used for feeding a coherent bandwidth of the forward control channel and a coherent time of the forward control channel back to the transmitter via a reverse control channel;
      wherein the coherent bandwidth is set as bandwidth with a channel frequency response having a correlation coefficient greater than 0.5, and the coherent time is set as a time interval with a channel impulse response having a correlation coefficient greater than 0.5.

14. The apparatus for dynamic switching of space-time decoding mode as claimed in claim 13, wherein the space-time coding mode comprises a space-time block coding mode and a space-frequency block coding mode.

15. A transmitter, that comprises:
   a coder with two modes of space-time block coding and space-frequency block, and
   a switching means for space-time/space-frequency block coding mode,
   wherein:
      the switching means is used for determining coding mode based on feedback information comprising a coherent bandwidth of a forward control channel and a coherent time of a forward control channel received via a reverse channel and for space-time block coding or space-frequency block coding a modulated symbol sequence for desired coding in a corresponding mode to generate a number of sets symbol streams corresponding to respective transmit antennas and further periodically feeding the used coding mode back to a receiver via the forward control channel;
      wherein the coherent bandwidth is set as bandwidth with a channel frequency response having a correlation coefficient greater than 0.5, and the coherent time is set as a time interval with a channel impulse response having a correlation coefficient greater than 0.5.

16. The transmitter of claim 15, wherein a rule for determining the coding mode by the switching means is that space-frequency block coding is determined if the coherent bandwidth is greater than a given multiple of interval width between two sub-carriers.

17. The transmitter of claim 15, wherein a rule for determining the coding mode by the switching means is that space-time block coding is determined if the coherent time is greater than a given multiple of time interval between two spread OFDM symbols.

18. The transmitter of claim 15, wherein a rule for determining the coding mode by the switching means is that space-frequency block coding is determined if α·width between two sub-carriers/correlation bandwidth is less than time interval between two OFDM symbols/correlation time, wherein α is an experience coefficient associated with channel characteristics.

19. A receiver, that comprises:
  a decoder with two modes of space-time block coding and space-frequency block coding, and
  a switching means for space-time/space-frequency block decoding mode, wherein:
  the switching means is used for mapping the received space-time coding mode information to a decoder of a corresponding space-time decoding mode for decoding in a corresponding mode based on the space-time coding mode information used at a transmitter and transmitted by a forward control channel and further feeding a coherent bandwidth of the forward control channel and a coherent time of the forward control channel back to the transmitter via a reverse control channel;
  wherein the coherent bandwidth is set as bandwidth with a channel frequency response having a correlation coefficient greater than 0.5, and the coherent time is set as a time interval with a channel impulse response having a correlation coefficient greater than 0.5.

* * * * *